Patented Mar. 21, 1933

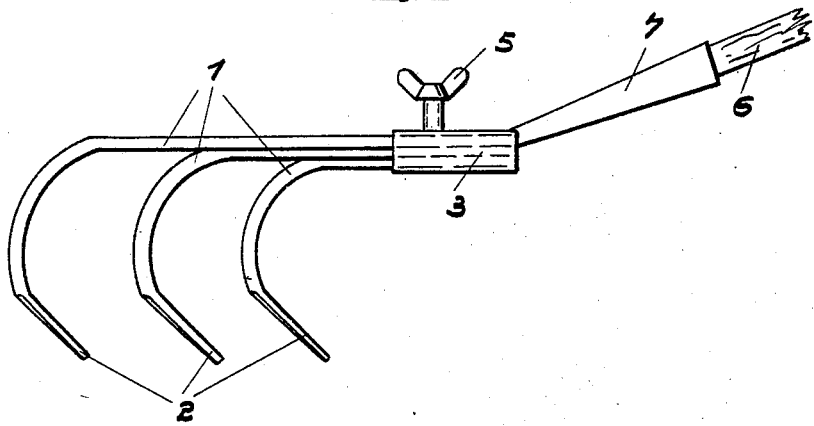
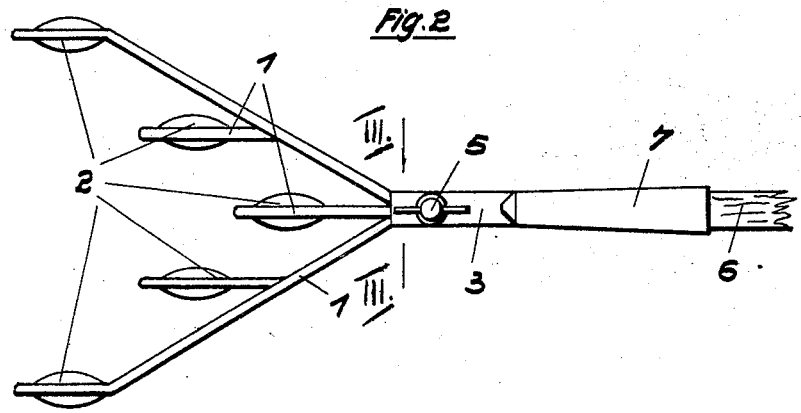
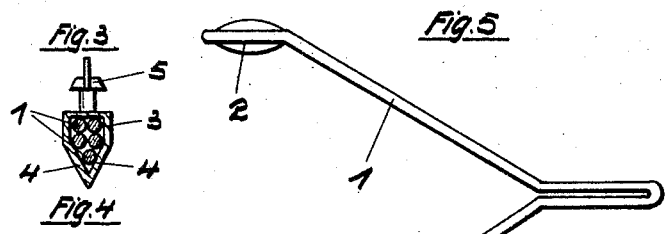
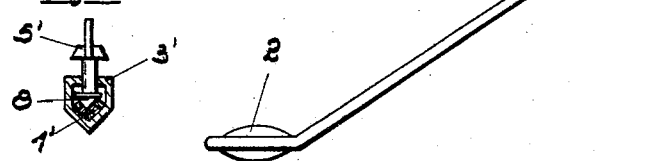

1,902,389

UNITED STATES PATENT OFFICE

GREGOR WOLF, OF BETZDORF-ON-THE-SIEG, GERMANY

HAND CULTIVATOR

Application filed November 22, 1930, Serial No. 497,509, and in Germany August 5, 1930.

This invention relates to a hand cultivator, remarkable for its form of construction according to its purpose of use. A special feature consists in the exchangeability of its tines.

Exchangeable cultivators exist in a large variety of forms of construction. For example in one form of construction the exchangeable tines are clamped between two plates held together by screws in such a manner, that the tines are prevented from turning. A further form of construction consists in that the tines are fixed singly on a holder by means of ring nuts. In both forms of construction a special well fitting spanner is necessary for exchanging the tines, which spanner is mostly not available, when it is required.

In another form of construction a screw must be loosened for every individual tine, in order to enable same to be exchanged. In the known forms of construction of hand cultivators it is necessary to loosen several screws, in order to remove the individual tines. For this purpose a spanner is necessary, if the tines are to retain their firm seating.

From that which has already been said it will be clear, that the exchangeability of the tines is very complicated and wastes time in the known cultivators and that the tines are very imperfectly held.

All these objections are overcome according to the invention, which consists substantially in that the cultivator tines, made of resilient round or square section steel, are bent from one piece in pairs, with the exception of the central separate tine or are connected in pairs at the rear end and mounted one above the other or side by side with a central tine in a five cornered housing, having a conical handle socket in such a manner that the tines are held pressed together by a single screw without further fixing means.

An embodiment of the invention is illustrated by way of example in the accompanying drawing in which:

Fig. 1 shows the cultivator in side elevation.

Fig. 2 is a top plan view of Fig. 1.

Fig. 3 is a section on line III—III of Fig. 2, round section steel being used for the tines.

Fig. 4 is a similar section to Fig. 3, the times being made of square section steel, Fig. 5 is a top plan view of a tine.

The tines 1 are mounted in a socket 3, which surrounds the tines, the central tine being unshiftably carried by the downwardly directed, inclined walls 4 of the five cornered socket 3. The clamping of the tines 1 in the socket 3 is effected by means of a set screw 5 screwed in the socket 3. A conical handle socket 7 for accommodating a handle 6 extends from the socket 3. The cultivator tines 1 are bent from one piece of round or square section steel in pairs so that the ends of the tines 1 sitting in the socket 3 bear the one against the other, the rear end of the central tine having a section adapted to the shape of the socket 3 so that a turning of this tine cannot occur.

When using square section steel for the tines 1', the socket 3' is made of correspondingly different shape. The screw 5' preferably carries a plate 8 in this instance.

Any desired number of tines 1 can be employed. The exchanging of the tines or of the pairs of tines is effected by means of the set screw 5 in the simplest manner imaginable and requires the minimum of time, this representing a considerable improvement over the known constructions. A further advantage consists in that the tine holder or socket 3 is of minimum width so that, when working narrow rows of plants, especially, when employing a single tine alone central tine), the entire implement remains narrow so that a damaging of the plants is prevented.

I claim:

1. A hand cultivator comprising a tine socket, a handle secured to said socket, said tine socket having five sides three of which are substantially at right angles to each other, a plurality of exchangeable tines arranged pairwise juxtaposed in said socket, a single exchangeable tine disposed in the angle formed by the remaining two sides of said socket, and a screw mounted in the wall of said socket opposite said last named angle for pressing said tines against each other and towards said angle, whereby said tines are securely held in position.

2. A hand cultivator comprising a tine socket, a handle secured to said socket, said tine socket having five sides, the three upper sides of said socket being disposed substantially at right angles to each other, the lower two sides forming substantially a right angle to each other but not to said first named sides, a plurality of exchangeable tines arranged pairwise in said socket and abutting the lower sides thereof, a single tine disposed in the angle formed by the lower sides, the portions of said tines within said socket being substantially square in cross section, and a screw mounted in the wall of said socket opposite the last named angle, said screw being provided with a head for pressing said tines towards said angle, whereby the tines are securely held in position.

In testimony whereof I affix my signature.

GREGOR WOLF.